Aug. 25, 1959    E. E. SIMS ET AL    2,900,970
SINGLE LEVER CONTROL FOR ENGINE STARTING MECHANISM
Filed Feb. 17, 1958    2 Sheets-Sheet 1
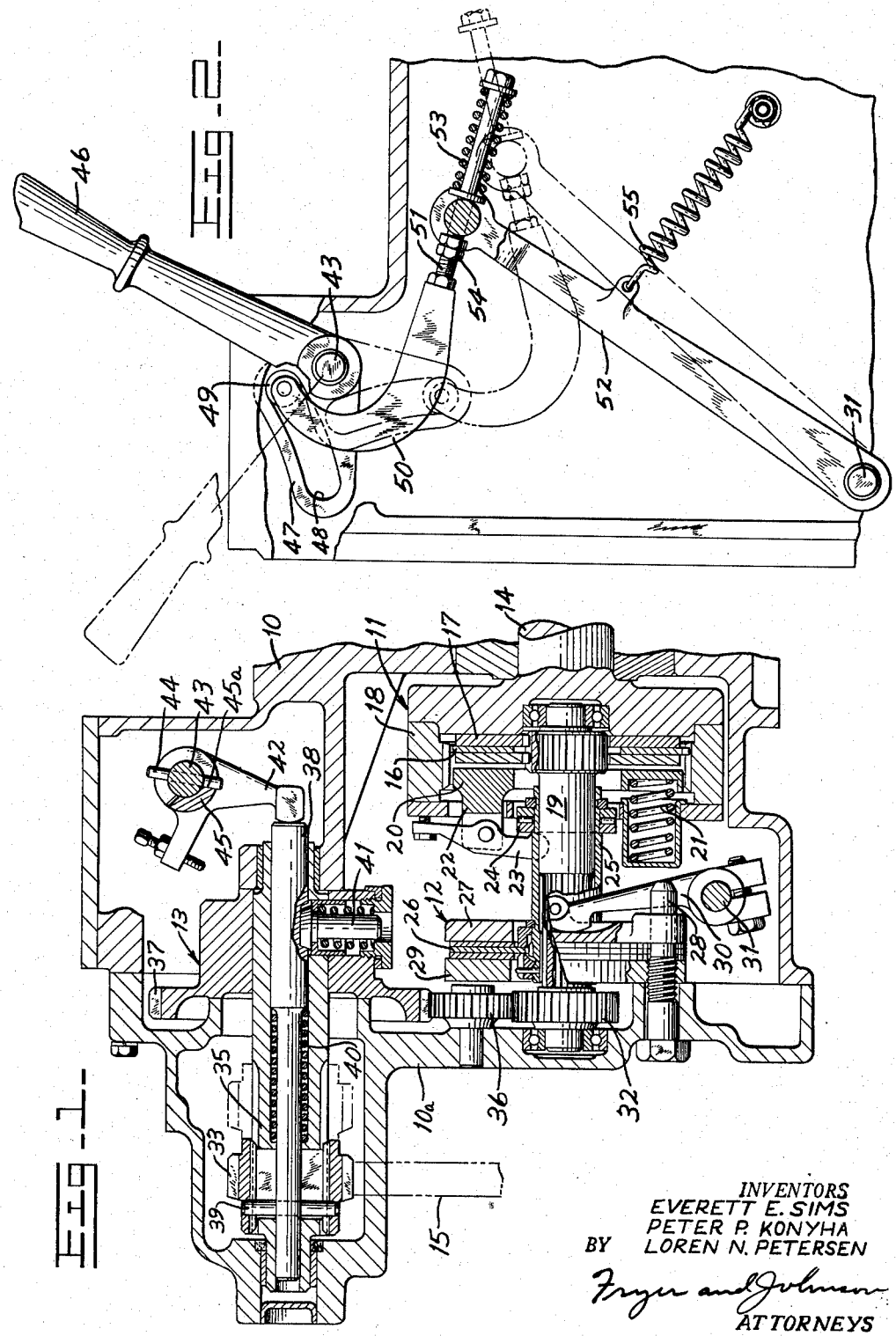
INVENTORS
EVERETT E. SIMS
PETER P. KONYHA
BY  LOREN N. PETERSEN
ATTORNEYS

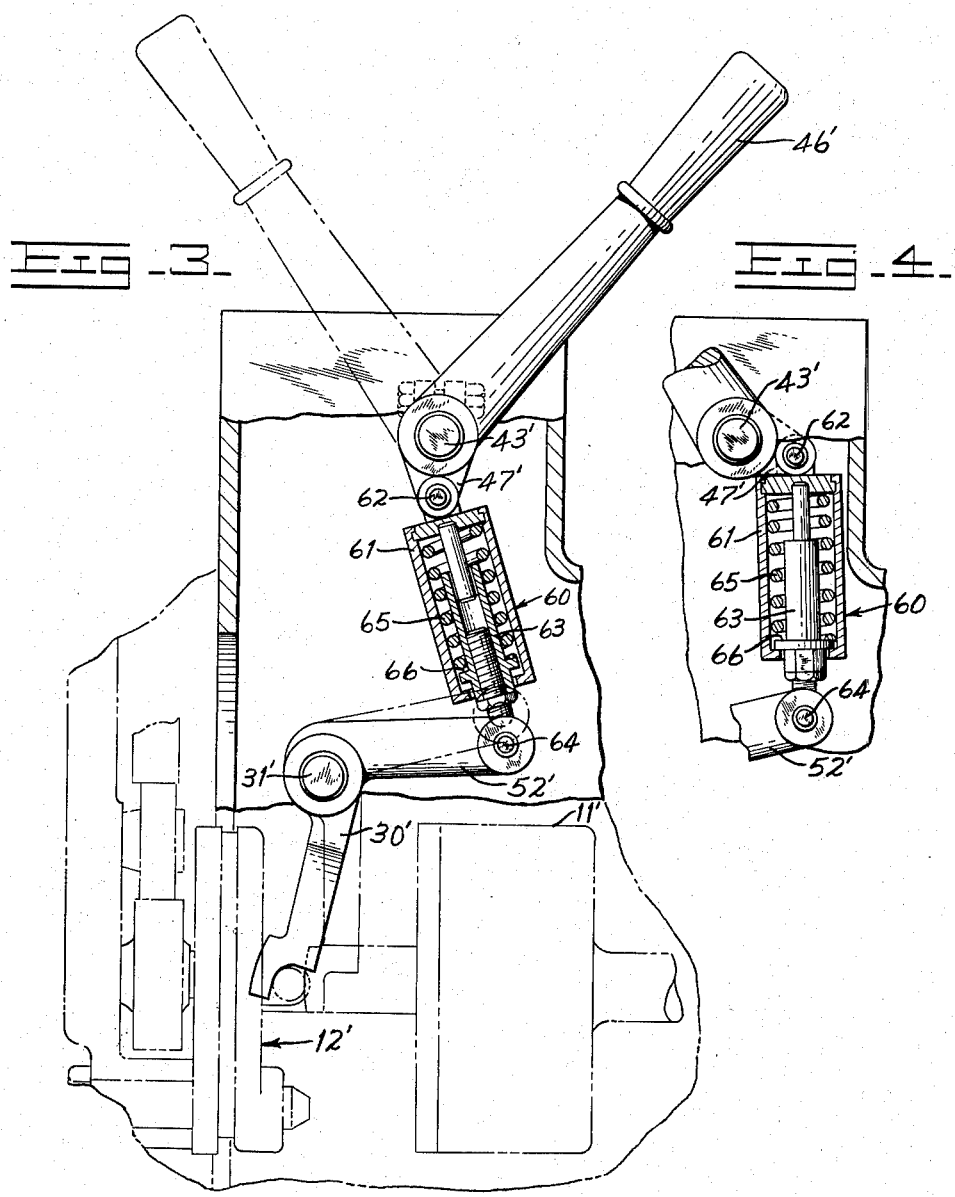

United States Patent Office 2,900,970
Patented Aug. 25, 1959

2,900,970

SINGLE LEVER CONTROL FOR ENGINE STARTING MECHANISM

Everett E. Sims, Peoria, Peter P. Konyha, Washington, and Loren N. Petersen, Peoria, Ill., assignors to Caterpillar Tractor Co., Peoria, Ill., a corporation of California Application February 17, 1958, Serial No. 715,804

3 Claims. (Cl. 123—179)

This invention relates to the starting mechanism for an internal combustion engine, and more particularly to the control means associated therewith which insures the desired sequential connection of the starting engine drive with the primary engine.

It is an object of the present invention to provide a single lever starting mechanism for an internal combustion engine wherein the control lever is not effected by disengagement of the pinion.

Another object of this invention is to provide a single lever control mechanism for a starting engine whereby the brake is automatically engaged before engagement of the drive pinion with the driven gear of the primary engine.

Another object of this invention is to provide a single lever control mechanism for a starting engine which actuates in sequential order the clutch, brake, and pinion through a single movement of the control lever.

A further object of this invention is to provide connecting linkage between a control lever and the clutch shaft brake of a starting mechanism which increases the mechanical advantage of the control lever as the brake is being applied.

Other objects and advantages of this invention will be made apparent in the following description, wherein reference is made to the accompanying drawings.

In the drawings:

Fig. 1 is a fragmentary view in section through a portion of a starting engine having the control of the present invention and with parts broken away to more clearly disclose the invention;

Fig. 2 is a fragmentary view in section with parts broken away of a different portion of the same engine to disclose the control linkage associated with the mechanism of Fig. 1;

Fig. 3 is a view similar to Fig. 2 which discloses a modified form of the control linkage shown in Fig. 2; and Fig. 4 is a fragmentary sectional view showing different positions of some of the parts shown in Fig. 3.

In Fig. 1 of the drawings, a portion of a starting engine housing is shown at 10 and contains a drive clutch generally indicated at 11, a disc-type brake 12, and a pinion drive and latch mechanism 13 for transmitting the drive from the starting engine crankshaft 14 to the primary engine ring gear indicated in broken lines at 15.

Clutch 11 comprises a plurality of clutch plates 16 and 17 splined to a clutch housing 18 and to a clutch drive shaft 19, respectively. Shaft 19 is suitably journaled in bearings at one end in crankshaft 14 and at its other end in a housing cover 10a. Plates 16 and 17 are normally retained in engagement through a friction ring 20 by a plurality of springs, one of which is shown at 21. Ring 20 includes a plurality of projections, one of which is shown at 22, and each of which carries a lever 23. Levers 23 bear against a thrust bearing 24 carried on a hollow shaft 25 which is splined for rotation with and relative axial movement on shaft 19. Hollow shaft 25 also carries a friction disc 26 which cooperates with a friction engaging ring 27 to form brake 12. Ring 27 is slidably supported for axial movement on a plurality of pins, one of which is shown at 28, which also serves to secure a stationary friction member 29 on cover 10a. A yoke 30 on a rockable shaft 31 contacts ring 27 to engage brake 12. With this arrangement, whenever brake 12 is applied by movement of yoke 30, clutch 11 will be simultaneously disengaged. On the other hand, when brake 12 is released clutch 11 will be automatically engaged by springs 21.

A gear 32 carried on the end of shaft 19 nearest cover 10a is adapted to drive a pinion gear 33 splined to a hollow shaft 35 through intermediate gears 36 and 37. A control rod 38 slidable within hollow shaft 35 carries a pin 39 which engages pinion 33. Pinion 33 is normally held out of engagement with ring gear 15 by a spring 40 and is retained in engagement by a spring-loaded latch 41 engaging a corresponding notch in rod 38. Upon starting of the primary engine and after it reaches a predetermined speed, centrifugal force will retract latch 41 and permit spring 40 to disengage pinion 33 from ring gear 15.

Pinion 33 is initially engaged with the ring gear by an arm 42 contacting the end of control rod 38. Arm 42 is journaled on a rockable shaft 43 which carries a pin 44.

Upon clockwise rotation of shaft 43, pin 44 contacts a face 45a on a projection 45 integral with arm 42 thereby actuating rod 38 to cause engagement of pinion 33 with ring gear 15. As shown in Fig. 2, shafts 31 and 43 are operatively connected with a single control lever 46 through resiliently connected linkage which includes a second arm 47 carried by shaft 43. A slot 48 within arm 47 embraces a roller 49 which is supported in a bifurcated lever 50. A stud 51 is threaded into an end of lever 50 and projects through one end of a brake engaging lever 52 carried on shaft 31. Brake lever 52 is resiliently positioned on the stud 51 by a spring 53 and a pair of adjusting nuts 54. The clearances in the aforedescribed linkage are absorbed by a spring 55 connected to lever 52 and to the housing as shown.

Assuming that the linkage is in the position indicated by broken lines, roller 49 is then resting in the lower end of slot 48 so that with initial movement of lever 46 in a clockwise direction the lever arm formed between roller 49 and shaft 43 will impart sufficient motion to shaft 31 to insure complete disengagement of clutch 11. With further clockwise movement of lever 46, roller 49 will move within slot 48 toward shaft 43 which is the center of rotation or fulcrum point of levers 46 and 47. This movement of roller 49 shortens the effective lever arm formed between roller 49 and shaft 43 which thereby provides a corresponding increase in mechanical advantage to lever 46 for loading brake 12. Brake 12 will thus stop rotation of clutch shaft 19 and pinion 33 through the gear train.

Still further movement of lever 46 in a clockwise direction will cause pin 44 (Fig. 1) to contact face 45a on projection 45 rotating arm 42 also in a clockwise direction to engage pinion 33 with ring gear 15 by means of rod 38. Roller 49 will then be actuated over-center with respect to a line drawn through the center of shaft 43 and the connection between levers 50 and 52. This over-center action of roller 49 will tend to lock lever 46 in its extreme pinion engaged position, shown in full lines in Fig. 2, while latch 41 retains pinion 33 in engagement with ring gear 15. From the above description it will be apparent that with a single movement of lever 46 the clutch, clutch-shaft brake and pinion will all be actuated in their proper sequential order.

The starting engine may then be started, if not already running, and lever 46 rotated in a counterclockwise direction which by means of the previously described linkage rotates shaft 31 and yoke 30 in a clockwise direction to release brake 12 and permit clutch 11 to be re-engaged by springs 21. Upon rotation of lever 46 as just described, shaft 43 will cause pin 44 to contact the face opposite face 45a on projection 45 to rock lever 42 in a counterclockwise direction out of contact with rod 38. When the primary engine reaches a predetermined speed, centrifugal force will disengage latch 41 and permit spring 40 to withdraw pinion 33 from engagement with ring gear 15. During pinion disengagement lever 42, as just described, is in such a position not to be affected by rod 38. With this arrangement no motion which might cause injury to an operator's hand is transmitted to control lever 46 during pinion disengagement.

Figs. 3 and 4 show a modification of the mechanism shown in Fig. 2 of the drawings. In this modified form an arm 47' is shown secured to a shaft 43' comparable to the shaft 43 of Figs. 1 and 2 and actuated by a control lever 46'. Lever 52' having an integral yoke portion 30' is secured for rotation about a shaft 31'. A telescoping resilient link 60 is provided between arm 47' and lever 52' for transmitting motion from control lever 46' to brake yoke 30'. Link 60 comprises a housing 61 connected to arm 47' by a pin 62 and a telescoping inner rod 63 connected to lever 52' by a pin 64. A spring 65 is provided within housing 61 and is seated on a shoulder 66 on rod 63. As control lever 46' is rotated from the position shown in Fig. 4 to that of Fig. 3, the moment arm formed by a line drawn from the center of pin 62 perpendicular to a line through the centers of shaft 43' and pin 64 decreases in length and provides a corresponding increase in mechanical advantage to control lever 46'. As pin 62 is actuated over the line drawn through the centers of shaft 43' and pin 64, control lever 46' will be locked in its pinion engaged position. Subsequent rotation of lever 46' in a counterclockwise direction will disengage brake 12' and permit reengagement of clutch 11' as previously described for the mechanism shown in Figs. 1 and 2.

We claim:

1. In a starting mechanism for an engine having a ring gear, a pinion on a hollow shaft for engagement with the ring gear, power transmission means between a power input shaft and the pinion including a clutch carried on a clutch shaft, a brake carried on said clutch shaft, control means for actuating said clutch, brake and pinion with a single lever carried on a rockable shaft, and connecting means between said pinion and lever comprising a rod slidable in said hollow shaft and secured to the pinion, an arm having a projection thereon rotatably retained on said rockable shaft, a pin carried by said rockable shaft contacting said projection in one direction to actuate said arm and rod to effect engagement of the pinion, and said pin being rotated out of contact with said projection during clutch engagement to permit disengagement of the pinion without transmitting motion to the control lever.

2. In a starting mechanism for an engine having a ring gear and a pinion for engagement with the ring gear, power transmission means between a power input shaft and the pinion including a clutch carried on a clutch shaft, a brake carried on said clutch shaft, control means actuated by a single lever carried on a rockable shaft for sequential operation of first, disengaging the clutch; second, applying the brake; and third, effecting engagement of the pinion with the ring gear, said control means comprising a sliding rod secured to the pinion, an arm on said rockable shaft contacting the end of said rod to engage the pinion with the ring gear, and a combination of linkage having its fulcrum point at the center of said rockable shaft and including a slotted arm secured to the rockable shaft with said slot retaining a roller therein to form an effective lever arm between it and the fulcrum, a bifurcated lever connected to said roller at one end and resiliently connected at its other end to a brake actuating lever secured to a second rockable shaft having a yoke thereon contacting said brake, and said roller being effective to shorten said effective lever arm to increase the control lever mechanical advantage as the brake is applied.

3. In a starting mechanism for an engine having a ring gear and a pinion for engagement with the ring gear, power transmission means between a power input shaft and the pinion including a clutch carried on a clutch shaft, a brake carried on said clutch shaft, control means actuated by a single lever carried on a rockable shaft for sequential operation of first, disengaging the clutch; second, applying the brake; and third, effecting engagement of the pinion with the ring gear, said control means comprising a sliding rod secured to the pinion, an arm on said rockable shaft contacting said rod to engage the pinion with the ring gear, a second arm on said rockable shaft connected to a resilient link comprising a housing secured to said second arm by a pin, a rod in telescoping relation with the housing being connected by a second pin to a brake actuating yoke lever carried on a stationary shaft, said linkage defining a moment arm formed by a line drawn from the center of said first pin perpendicular to a line drawn between the centers of the rockable shaft and said second pin whereby the moment arm is shortened as the first pin is rotated by the control lever in a clockwise direction to increase the control lever mechanical advantage as the brake is applied.

References Cited in the file of this patent

UNITED STATES PATENTS

| 1,784,354 | Haussman | Dec. 9, 1930 |
| 1,936,032 | Ruesenberg | Nov. 21, 1933 |
| 2,437,121 | Petersen | Mar. 2, 1948 |
| 2,777,328 | Wagner | Jan. 15, 1957 |
| 2,822,795 | Cicero et al. | Feb. 11, 1958 |